July 27, 1937.           R. L. PERKINS           2,088,213
PROCESS FOR THE DRYING OF MATERIALS
Filed March 13, 1935
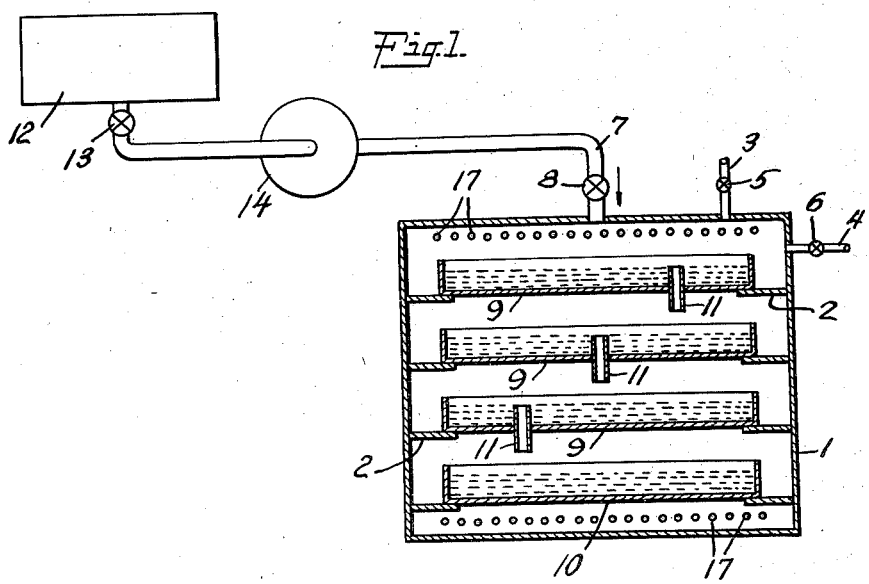
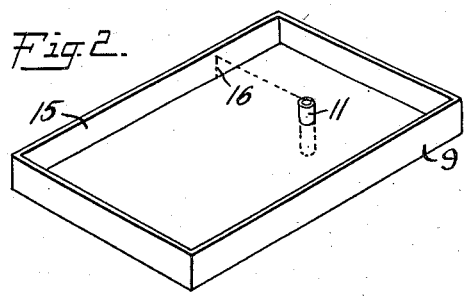
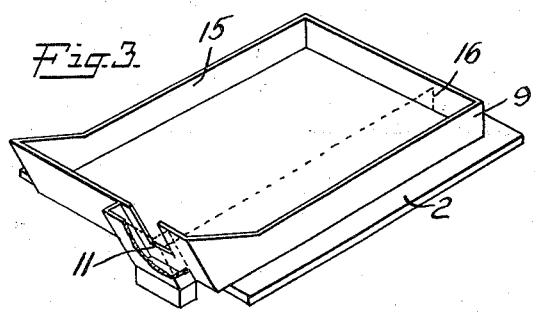
INVENTOR
ROBERT L. PERKINS.
BY
ATTORNEY Patented July 27, 1937

2,088,213

UNITED STATES PATENT OFFICE 2,088,213

PROCESS FOR THE DRYING OF MATERIALS

Robert L. Perkins, East Aurora, N. Y., assignor to National Aniline & Chemical Company, Inc., New York, N. Y., a corporation of New York Application March 13, 1935, Serial No. 10,755

2 Claims. (Cl. 260—50)

This invention relates to the drying or evaporation of materials and more especially to the drying or evaporation of materials which are deleteriously affected by exposure to the air.

It is well known that solutions or slurries of certain materials, for example leuco indigo, when exposed before and/or during evaporation or drying to oxygen-containing gases such as air, tend to undergo oxidative changes of a deleterious nature. Leuco indigo, for example, in a solution or slurry, upon exposure to air, becomes partially oxidized to indigo blue.

By the present invention such disadvantages of exposure to a deleterious atmosphere before and/or during the evaporation of solutions or slurries of such materials are overcome, the material being readily and efficiently transferred to a drier, evaporated, and obtained as the dried product, substantially without the intervening risk of the aforementioned undesirable changes.

In the accompanying drawing, forming a part of this specification and showing for purposes of exemplification, a preferred form of apparatus for practicing this invention, Figure 1 is a side elevational view, partly in section, of an evaporating chamber communicating with a storage vessel;

Fig. 2 is a perspective view of one form of the trays for the drying or evaporating chamber; and Fig. 3 is a perspective view of a preferred form of tray for use in the drying or evaporating chamber.

Referring to the drawing, in which like numerals refer to like parts, reference numeral 1 represents a container or drying chamber. Integral with, or attached to, the interior walls of the drying chamber are a plurality of shelves 2 adapted to support drying trays. The drier is provided with heating means of the conventional type: for example, the shelves 2 may be hollow plates which are connected through suitable inlets, outlets and controls to steam or hot water systems; or the drier may be provided with a steam or hot water coil 17. Outlet pipes 3 and 4, provided with valves 5 and 6, respectively, pierce the walls of the drying chamber 1, preferably at the upper portion thereof, and are adapted for the withdrawal of solvent vapors from the container 1 during evaporation and for exhausting said container or replacing the atmosphere therein with an innocuous gas prior to the introduction of material thereinto. A feed pipe 7, preferably situated at the top of drying chamber 1 and communicating with a storage vessel 12, within which the solution or slurry of the material to be dried may be prepared and/or maintained under an atmosphere of innocuous gas, serves for the introduction of material to the container 1 after said container has been evacuated of harmful gas or filled with an innocuous gas, as will be more fully hereinafter described. Valves 8 and 13 on pipe 7 serve to regulate the rate of flow of the solution or slurry therethrough. The solution or slurry may be transferred from the storage vessel through the pipe 7 to container 1 by the aid of gravity, or by a pump 14 provided for the purpose or by gas pressure above the surface of the material in the storage vessel 12.

Supported on the shelves 2 within the container 1 are drying trays 9 and 10 adapted to contain solution or slurry. The drying trays 9 are provided with overflow means, for example a pipe 11 vertically positioned through the bottom of the trays, through which solution or slurry may flow downwardly through the container from tray to tray. The bottom of the lowermost tray 10 is imperforate. In the drawing a series of four trays is shown, although it will be understood that any number may be used, depending upon the amount of material to be evaporated and the surface exposure desired.

In Fig. 2 one of the trays 9 is shown in detail. Overflow pipe 11 piercing the bottom of the tray extends upwardly for a distance which is slightly less than the height of the walls 15, as indicated by reference numeral 16 and defines the maximum level to which the trays may be filled with solution or slurry. The overflow pipe may extend downwardly any suitable distance.

Alternatively, as shown in Fig. 3, in a preferred modification of one of the trays 9, the overflow pipe 11 may be attached to the outer surface of one end of the tray, in a manner to receive the overflow from the tray through an opening or slot which is provided therefor in the said end at the desired level of the solution or slurry in the tray. The overflow pipe may extend downward any suitable distance.

The process of this invention will be hereinafter described in connection with the drying or evaporation of a slurry of the sodium salt of leuco indigo, which compound, upon exposure to the air, tends to be oxidized to form indigo blue. It will be understood, however, that the invention is not limited to the drying or evaporation of this material and may be employed in the drying or evaporation of free leuco indigo, or salts thereof or materials subject to deleterious oxidation upon exposure to the atmosphere and also materials which foam, as more fully explained hereinafter.

In accordance with the process of this invention, a slurry of the sodium salt of leuco indigo, hereinafter termed leuco indigo, may be prepared and maintained in vessel 12 under an atmosphere which is free from air. For example, the space above said slurry may be evacuated or filled with an innocuous gas such as nitrogen prior to the preparation of the slurry. The trays 9 and 10 may be placed within the drying chamber 1, the tray 10 being positioned at the bottom of the series, the chamber closed to the atmosphere and then evacuated (via outlets 3 and 4). If desired, the interior of the chamber may be filled with an innocuous gas such as nitrogen. Valves 8 and 13 on pipe 7 may then be opened and the slurry of leuco indigo caused to flow through pipe 7 to the top of the container 1 into the uppermost drying tray 9. When the solution or slurry within said drying tray rises to a level corresponding with the overflow opening of the pipe 11, the excess slurry overflows downwardly therethrough into the drying tray beneath the pipe, this process being repeated until all the trays within the drying chamber are filled to the desired level. Valves 8 and 13 may then be closed, and if desired, heat applied to facilitate the evaporation of solvent from the solution or slurry under atmospheric or subatmospheric pressure, the vapors being withdrawn through pipes 3 and/or 4. The vacuum, if such is used, may be released when the evaporation is completed, the drying chamber opened, the trays removed, and the dried leuco indigo removed therefrom. If desired, during the process of evaporation additional slurry may be added to the trays, in the manner hereinabove described to occupy the space left in the trays by evaporated solvent. In this manner the evaporation may be continued until the trays 9 and 10 are substantially filled with dried leuco indigo.

It will be noted that in the practice of the process a plurality of substantially thin layers of the leuco indigo is produced in the container. The formation of such thin layers facilitates evaporation or drying due to exposure to evaporation of an increased area of material. Furthermore the formation of such layers is accomplished without exposing the material during transfer or evaporation to the atmosphere, thereby preventing oxidation of the leuco indigo to indigo blue.

The process of this invention is advantageous for the evaporation of solutions or slurries of materials which have a tendency to foam. In introducing such material, one or more of the lower trays in the drying chamber is preferably left empty. During evaporation of the material, as described above, an excessive amount of foam, if formed, does not splash over the sides of the trays and onto the walls, as is generally the case with prior evaporation equipment. In accordance with this invention, the foam overflows through the overflow pipes and ultimately enters the empty trays in the lower portion of the chamber, wherein the liquid content thereof may be evaporated without loss of product.

It will be noted that the process of this invention obviates the charging and transfer of each individual tray as is customary in the operation of the usual shelf drier. It permits charging the drier and evaporation of increased quantities of solution or slurry without opening the drier. It is advantageous in the evaporation of materials which are deleteriously affected by air and furthermore it obviates the difficulties encountered in the evaporation of liquids which tend to foam.

It is to be understood that this invention is not restricted to the present disclosure otherwise than as defined by the appended claims.

It is intended that the term "slurry" as used herein shall be construed to include a solution, or a paste, or slurry, and the term "leuco indigo" is meant to include leuco indigo per se, or its water soluble salts and particularly its sodium or potassium salts.

I claim:

1. A process of drying a slurry of a substance solid in the dry form, which slurry is deleteriously affected by exposure to the air and when heated has foaming tendencies, in a container having a plurality of intercommunicating trays, which process comprises establishing an atmosphere substantially free of air in the container, introducing the slurry into the container to form a plurality of spaced substantially thin layers in said trays while excluding air therefrom, said layers being formed by overflow of slurry from one tray to a lower tray, the amount of slurry thus introduced being insufficient to fill the lowermost tray and heating said slurry to effect the drying thereof while excluding air therefrom.

2. A process of drying a slurry of leuco indigo in a container having a plurality of communicating trays therein disposed one above the other, which process comprises establishing an atmosphere substantially free of air in the container, introducing said slurry of leuco indigo into the container to form a plurality of spaced substantially thin layers in said trays while excluding air therefrom, said layers being formed by overflow of slurry from an upper to a lower tray, the amount of slurry thus introduced being insufficient to fill the lowermost tray, heating said slurry to effect the drying thereof while excluding air therefrom and recovering the dried leuco indigo.

ROBERT L. PERKINS.